United States Patent [19]

Yamazaki

[11] Patent Number: 5,418,639
[45] Date of Patent: May 23, 1995

[54] LIGHT BEAM SCANNING DEVICE
[75] Inventor: Hiroyuki Yamazaki, Hachioji, Japan
[73] Assignee: Konica Corporation, Tokyo, Japan
[21] Appl. No.: 181,766
[22] Filed: Jan. 21, 1994
[30] Foreign Application Priority Data
  Feb. 4, 1993 [JP] Japan .................. 5-039271
[51] Int. Cl.⁶ .............................................. G02B 26/08
[52] U.S. Cl. ..................................... 359/216; 359/205; 359/207; 359/217
[58] Field of Search ............................. 359/205–207, 359/216–220, 708–718, 662; 346/108; 250/236

[56] References Cited

U.S. PATENT DOCUMENTS 5,025,268  6/1991  Arimoto et al. ................... 359/205

Primary Examiner—Loha Ben
Assistant Examiner—James Phan
Attorney, Agent, or Firm—Frishauf, Holtz, Goodman & Woodward

[57] ABSTRACT

A light beam scanning device in which two image formation lenses are disposed between a rotational polygonal mirror to reflect a light beam sent from a laser beam source, and a surface to be scanned. An image is formed on the scanned surface by the reflected light beam. A reflecting surface of the mirror and the scanned surface are approximately set in a geometrical-optical conjugate relation. The lens includes a surface on which a change in the radius of curvature in a secondary scanning direction is non-symmetrical with respect to the distance h from the optical axis. When $rh(+)$ is defined as the radius of curvature in the secondary scanning direction section parallel to the optical axis at a position distant from the optical axis by h in the direction of "+" in the primary scanning direction, and $rh(-)$ is defined as the radius of curvature in the secondary scanning direction section parallel to the optical axis at a position distant from the optical axis by h in the direction of "−" in the primary scanning direction, $rh(+)$ and $rh(-)$ are expressed by the following equation:

$$rh(\pm) = r_0 = (1 + k(\pm) \cdot R_p \cdot a/n) \cdot R \cdot [1 - \cos\{\sin^{-1}(h/R)\}]$$

and the following inequality is satisfied:

$$k(+) - k(-) > 0.005 M^2,$$

M is a lateral magnification in the secondary scanning direction of the lenses.

3 Claims, 6 Drawing Sheets

LIGHT BEAM SCANNING DEVICE

BACKGROUND OF THE INVENTION

The present invention relates to a light beam scanning device, and more particularly relates to a light beam scanning device by which reflection-scanning is conducted on a beam of light sent from a laser beam source, wherein a rotational polygonal mirror is used for the scanning operation.

Figure 1:
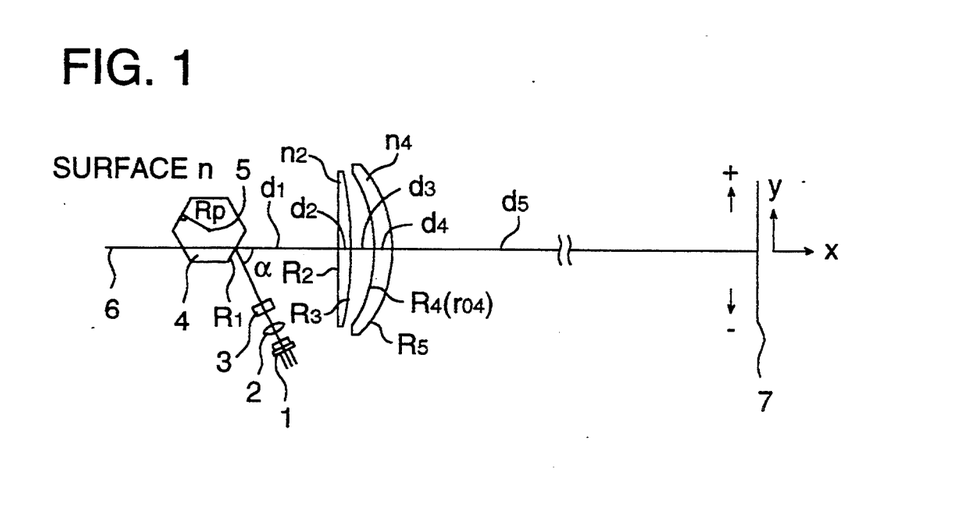
FIG. 1 is a sectional view of the primary scanning direction including the optical axis, wherein the sectional view shows the first embodiment of the optical scanning system of the present invention.

Rotational polygonal mirrors are generally used for a light reflection means in an optical system of a light beam scanning device such as a laser beam printer and others. In the case where a rotational polygonal mirror is used in order to compensate the facet angle error, the following conditions are commonly maintained:

On a surface of the secondary scanning direction, a reflecting surface of the rotational polygonal mirror and a surface to be scanned are approximately set in a geometrical-optical conjugate relation, and a condensed light beam is incident upon a position close to the aforementioned reflecting surface. However, as the rotational polygonal mirror is rotated, the position of the reflecting surface is moved. As a result, the aforementioned conjugate relation can not be maintained. Therefore, an image formation point on the surface of the secondary scanning direction is shifted, so that an image surface curvature is caused with respect to the image formation point on the surface of the secondary scanning direction. Further, as illustrated in FIG. 1, a beam of light incident upon the aforementioned reflecting surface forms an angle $\alpha$ with respect to an optical axis of the scanning lens on a surface including the scanning lines. Accordingly, a rotational center of the rotational polygonal mirror is not located on the optical axis, so that the movement of the aforementioned reflecting surface is not symmetrical to the optical axis of the scanning lens. For this reason, in the case where a lens system symmetrical to the optical axis is used, it is difficult to appropriately correct the image surface curvature of the image formation point on the secondary scanning direction surface all over the scanning regions while consideration is given to the quantity of movement of the reflecting surface which is not symmetrical with respect to the optical axis.

When the size of a spot is $\omega_0$ at a focal position in an optical laser beam system, and also when the size of a spot is $\omega_X$ at a position distant from a focal position by X, it is known that a relation between $\omega_X$ and $\omega_0$ can be expressed by the following equation.

$$\omega_x = \omega_0 \sqrt{1 + (4\lambda X/\pi\omega_0^2)^2} \tag{1}$$

In this case, $\lambda$ is the wave length of laser beams.

In order to obtain images of high quality all over the scanning regions, the fluctuation of the size of a spot of the secondary scanning direction is suppressed so that it can be maintained within a region of 10%. In this case, the results of calculation according to the equation (1) are described as follows.

In the case of $$\omega_0 = 90 \text{ to } 99 \text{ } \mu m, X = \pm 3.7 \text{ mm}. \tag{A}$$

In the case of $$\omega_0 = 70 \text{ to } 77 \text{ } \mu m, X = \pm 2.2 \text{ mm}. \tag{B}$$

In the case of $$\omega_0 = 50 \text{ to } 55 \text{ } \mu m, X = \pm 1.1 \text{ mm}. \tag{C}$$

As can be seen from the foregoing, when the resolution is improved, the allowable depth is reduced. In the case where the required resolution is low, practical problems are not caused even when a lens system symmetrical with respect to the optical axis is used. However, as the required resolution becomes high, the curvature of the image surface is increased in the case where the lens system symmetrical with respect to the optical axis is used.

Figure 4:
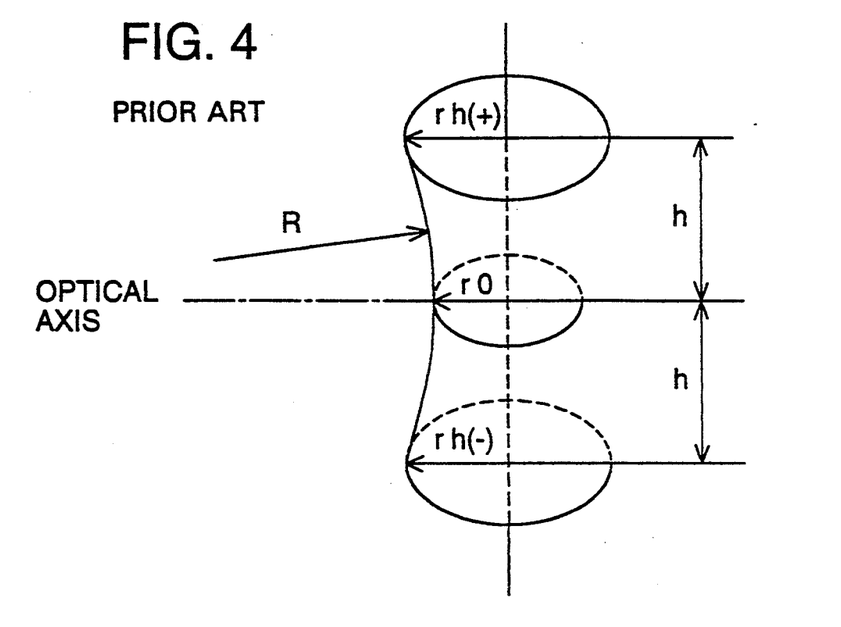
FIG. 4 is a view showing the configuration of a conventional deformed cylindrical surface which is formed symmetrically with respect to the optical axis.

A scanning device in which the image surface curvature is corrected all over the scanning regions is disclosed, for example, in Japanese Patent Publication Open to Public Inspection No. 49408/1991. In this scanning device, a deformed cylindrical lens shown in FIG. 4 is used, in which the radius of curvature rh in a section of the secondary scanning direction is determined as a function of the distance h from the optical axis. Therefore, this deformed cylindrical lens can provide a wide field angle which can not be provided by conventional cylindrical or toric lenses. However, in this case, a change in the radius of curvature is symmetrical with respect to the optical axis. Therefore, this scanning device can not correct a fluctuation of the image formation position on a surface of the secondary scanning direction which is generated in accordance with the fluctuation of a reflecting surface position when a rotational polygonal mirror is used as a reflecting system.

According to a scanning device disclosed in Japanese Patent Publication Open to Public Inspection No. 23313/1990, the radius of curvature on the secondary scanning direction surface is made to be non-symmetrical with respect to the optical axis in order to correct the fluctuation of the image formation position on a surface of the secondary scanning direction which is generated in accordance with the fluctuation of a reflecting surface position when a rotational polygonal mirror is used as a reflecting system. However, in this case, a lateral magnification of the scanning lens is not less than 3 and not more than 5. As described above, the magnification is high. Accordingly, it is required to manufacture the device highly accurately. As a result, the cost is raised. Further, since the lens including the non-symmetrical surface is made of glass, the manufacturing cost is raised from the view point of workability. Consequently, the above scanning device is not suitable for mass production so as to reduce the cost.

SUMMARY OF THE INVENTION

An object of the present invention is to provide a light beam scanning device in which a highly efficient image formation lens for use in an optical scanning system is used. This image formation lens is applied to an optical scanning system disposed between a rotational polygonal mirror conducting reflection-scanning with a beam of light sent from a laser beam source, and a surface to be scanned. Therefore, an image is formed on the scanned surface by the reflected light beam, and a reflecting surface of the rotational polygonal mirror and the scanned surface are approximately set in a geometrical-optical conjugate relation. In this optical scanning system, a change in the image forming position on the secondary scanning direction surface, which is caused in accordance with the fluctuation of the reflecting surface position of the rotational polygonal mirror, can be appropriately corrected, that is, the image surface curvature at the image forming position of the secondary scanning direction on the scanned surface can be appropriately corrected. Further, the image formation lens can be manufactured at low costs.

Figure 5:
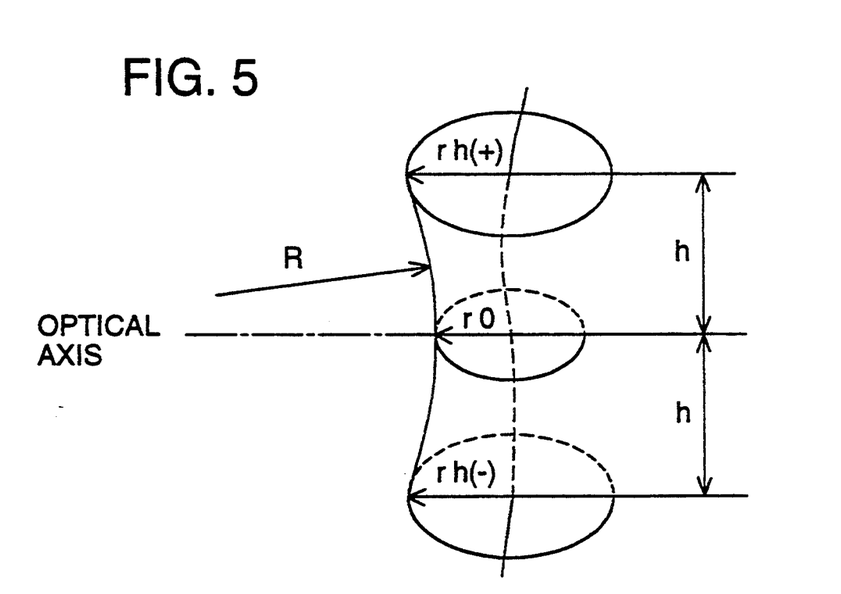
FIG. 5 is a schematic illustration showing the configuration of a non-symmetrical surface with respect to the optical axis of the present invention.

Construction of the scanning device of the present invention is illustrated in FIG. 1. The scanning device of the present invention includes a rotational polygonal mirror 4 which conducts reflection-scanning on a beam of light incident upon the rotational polygonal mirror 4 through a collimator lens 2 and a cylindrical lens 3. A rotational center 5 of the rotational polygonal mirror 4 is disposed deviating from an optical axis 6. An image formation lens is disposed between the rotational polygonal mirror 4 and a surface 7 to be scanned, and an image is formed on the scanned surface 7 with a beam of reflected light. On a surface of the secondary scanning direction, the reflecting surface of the rotational polygonal mirror and the surface to be scanned are approximately set in a geometrical-optical conjugate relation. As illustrated in FIG. 5, the image formation lens includes a surface on which a change in the radius of curvature in the section of the secondary scanning direction is non-symmetrical with respect to the distance h from the optical axis. Character $\alpha$ is an angle formed between a beam of light incident upon the rotational polygonal mirror and the optical axis of the optical scanning system; the radius of an inscribed circle of the rotational polygonal mirror is Rp; the number of surfaces is n; the radius of curvature of a non-symmetrical surface with respect to the optical axis in the primary scanning direction section including the optical axis is R; the radius of curvature in the secondary scanning direction section is $r_0$; a primary scanning side including a rotational center of the rotational polygonal mirror is defined as the "+" side with respect to the optical axis of the optical scanning system; and the opposite side is defined as the "−" side. When the characters are defined as described above, the "+" and "−" sides are not symmetrical to each other as illustrated in FIG. 5. In this case, rh(+) is defined as the radius of curvature in the secondary scanning direction section parallel to the optical axis at a position distant from the optical axis by h in the direction of "+" in the primary scanning direction, and rh(−) is defined as the radius of curvature in the secondary scanning direction section parallel to the optical axis at a position distant from the optical axis by h in the direction of "−" in the primary scanning direction. Then, rh(+) and rh(−) are expressed by the following equation.

$$rh(\pm) r_0 + (1 + k(\pm) \cdot R_p \cdot \alpha/n) \cdot R \cdot [1 - \cos\{\sin^{-1}(h/R)\}] \quad (2)$$

Further, the following inequality is satisfied.

$$k(+) - k(-) > 0.005 M^2 \quad (3)$$

In this case, M is a lateral magnification in the secondary scanning direction of the optical scanning system.

In the above light beam scanning device, a lateral magnification in the secondary scanning direction of the optical scanning system is preferably not more than 3. It is preferable that the optical scanning system is composed of two lenses, and it is also preferable that a lens including a non-symmetrical surface with respect to the optical axis is made of plastic.

Figure 6:
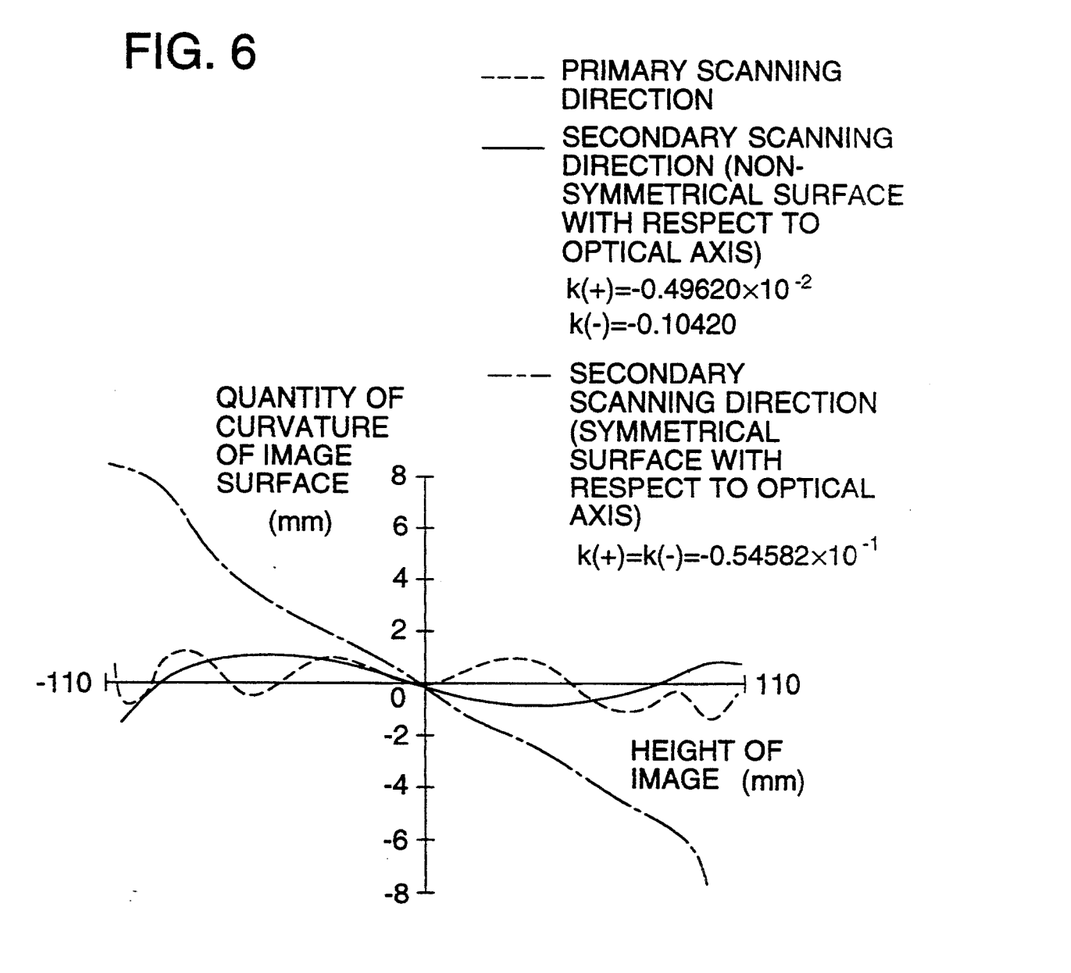
FIG. 6 is a view showing the curvature of an image surface of the secondary scanning direction in the case where the non-symmetrical surface in the first embodiment is replaced with a symmetrical surface with respect to the optical axis.
Figure 7:
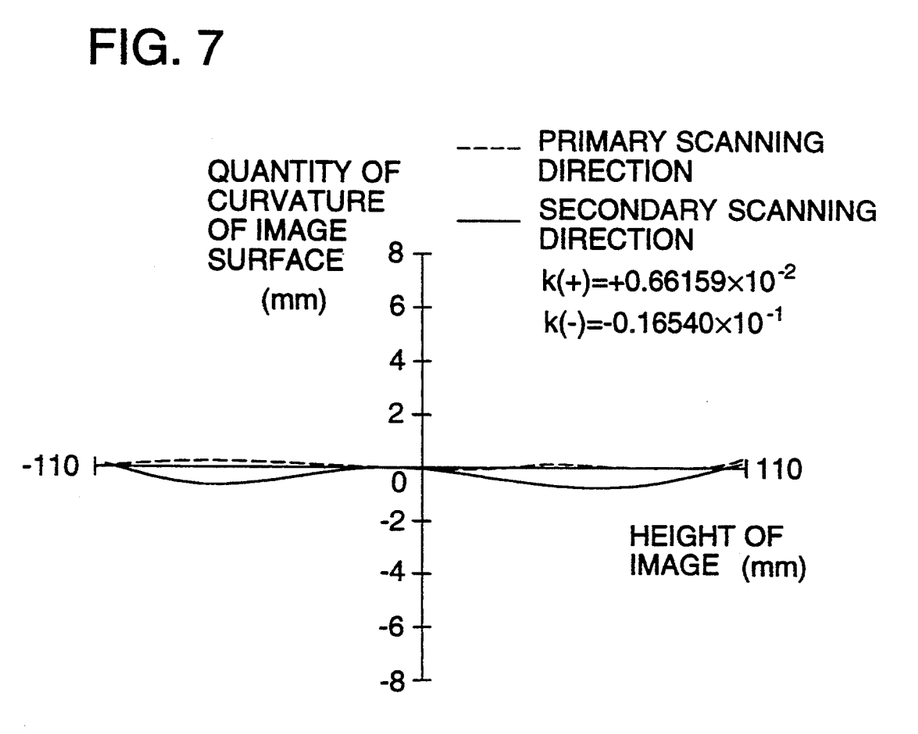
FIG. 7 is a view showing the curvature of an image surface in the second embodiment of the present invention.
Figure 8:
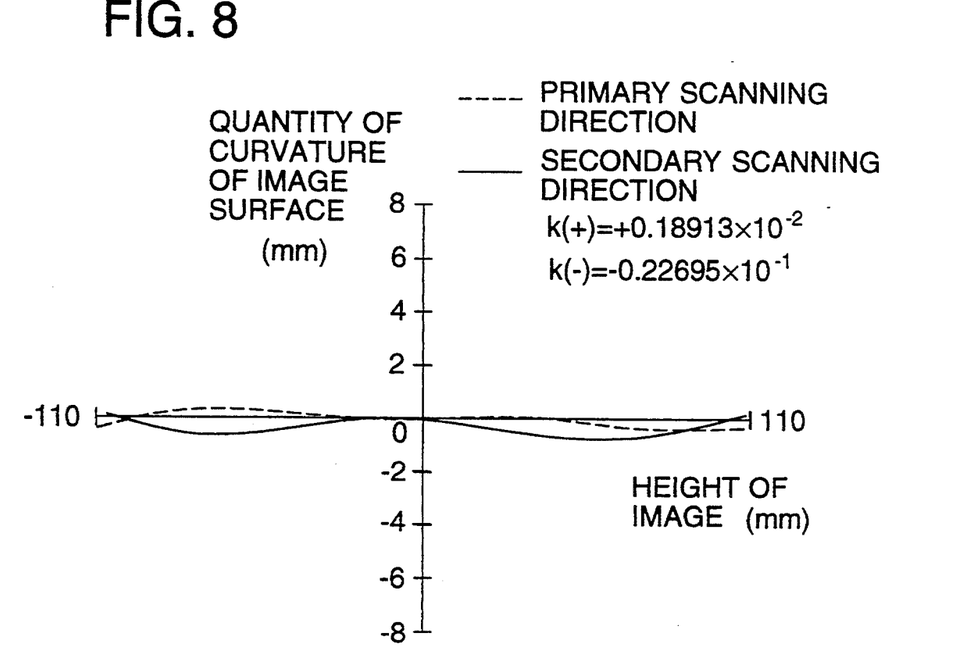
FIG. 8 is a view showing the curvature of an image surface in the third embodiment of the present invention.
Figure 9:
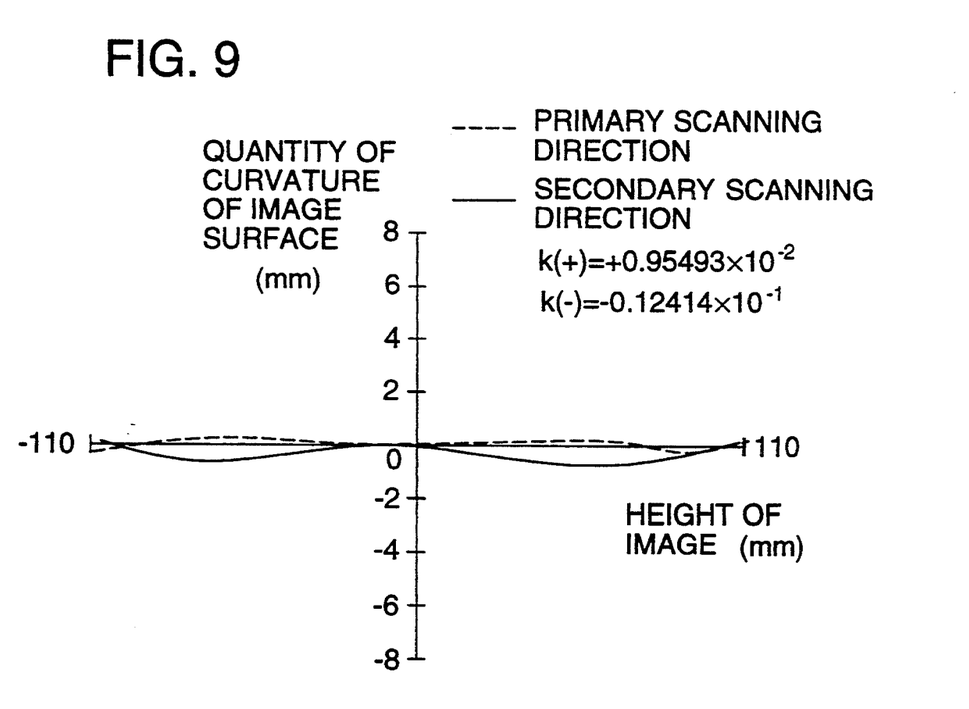
FIG. 9 is a view showing the curvature of an image surface in the fourth embodiment of the present invention.
Figure 10:
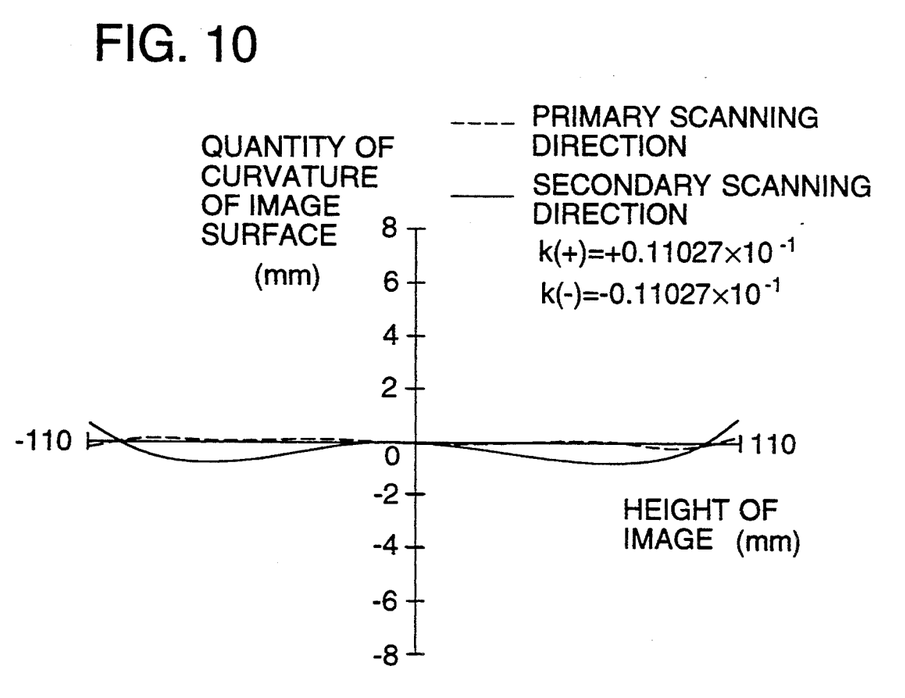
FIG. 10 is a view showing the curvature of an image surface in the fifth embodiment of the present invention.
Figure 11:
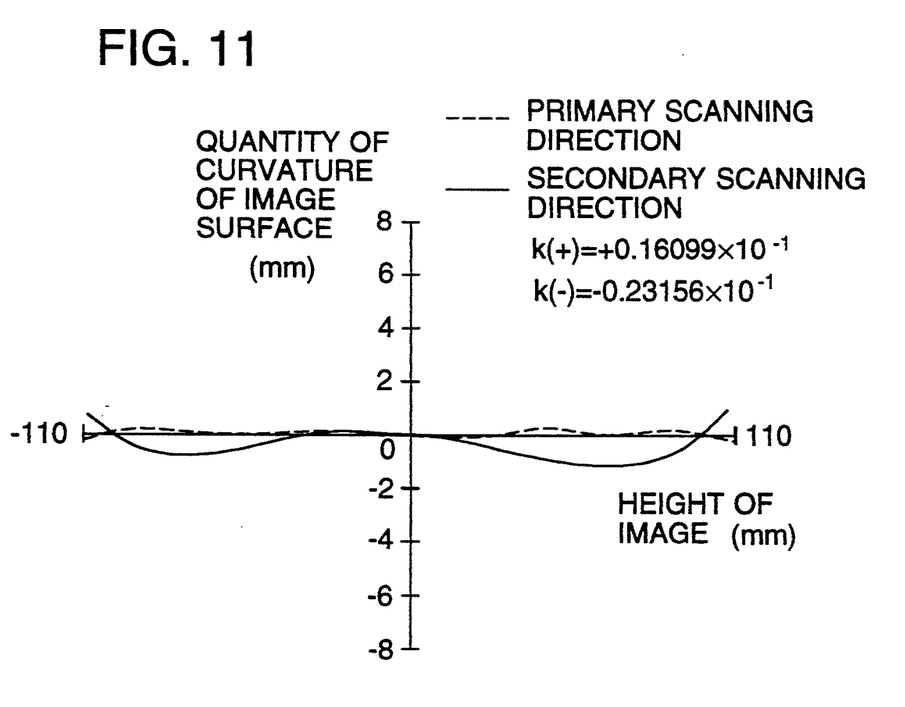
FIG. 11 is a view showing the curvature of an image surface in the sixth embodiment of the present invention.

In the optical scanning system in which the reflecting surface of a rotational polygonal mirror and the surface to be scanned are maintained in a conjugate relation, the reflecting surface of the rotational polygonal mirror does not coincide with a rotational center, and a beam of light incident upon the reflecting surface of the rotational polygonal mirror is sent in a lateral direction so that the beam of light forms an angle $\alpha$ on the primary scanning surface with respect to the optical axis of the optical scanning system. For this reason, in the case where an optical scanning system symmetrical with respect to the optical axis is used, an image formation surface on the secondary scanning direction surface is curved non-symmetrically with respect to the optical axis as illustrated by a one-dotted chain line in FIG. 6. In order to correct this non-symmetry, in the optical scanning system, it is necessary to include a surface non-symmetrical with respect to the optical axis, and on the surface, the radius of curvature of the secondary scanning direction section on the "+" image height side and that on the "−" image height side are different.

The radius of curvature in the secondary scanning direction section parallel with an optical axis distant from an optical axis on the non-symmetrical surface by h, is affected by an angle formed between a beam of light incident upon the rotational polygonal mirror and the optical axis of the optical scanning system, and also affected by the size of the rotational polygonal mirror and the number of faces. This radius of curvature can be expressed by the above equation (2). The coefficient k in this equation on the "+" image height side with respect to the optical axis, and that in this equation on the "−" image height side are different. As a result, a lens surface can be provided, the configuration of which is non-symmetrical with respect to the optical axis.

Specifically, it is preferable that a difference between the coefficient k(+) on the "+" image height side and the coefficient k(−) on the "−" image height side satisfies the equation (3). When it exceeds this lower limit, the non-symmetry of the curvature of an image surface can not be sufficiently corrected, so that the object of the present invention is difficult to be accomplished.

Further, when the lateral magnification of the optical scanning system is lowered (it is preferable that the lateral magnification is not more than 3), accuracy of parts and arrangement may be loosened, so that the manufacturing cost can be lowered.

When the lens including the non-symmetrical surface is made of resin, this lens can be manufactured by means of forming as long as a metallic mold of this specific configuration is provided. In this way, this lens can be realized at low costs. In this connection, the metallic mold can be provided when a numerically controlled grinder is applied.

BRIEF DESCRIPTION OF THE DRAWINGS

FIG. 6 is a view showing the curvature of an image surface of the first embodiment of the present invention, and also

DETAILED DESCRIPTION OF THE PREFERRED EMBODIMENTS

In the following tables, R and r denote a radius of curvature of a surface, d denotes an interval between surfaces, and n denotes an index of refraction. Specifically, $R_1$ is a radius of curvature of a reflecting surface of a rotational polygonal mirror, $R_2$ is a radius of curvature of the first surface of an optical scanning system, $R_3$ is a central radius of curvature of the second surface of the optical scanning system, $R_4$ is a radius of curvature of a primary scanning direction section of the third surface of the optical scanning system, $r_{04}$ is a radius of curvature of a secondary scanning direction section of the third surface of the optical scanning system, $R_5$ is a central radius of curvature of the fourth surface of the optical scanning system, $d_1$ is an interval on the axis between a reflecting surface of the rotational polygonal mirror and the first surface of the optical scanning system, $d_2$ is a thickness on the axis of the first lens of the optical scanning system, $d_3$ is an interval on the axis between the first and second lenses of the optical scanning system, $d_4$ is a thickness on the axis of the second lens in the optical scanning system, and $d_5$ is an interval on the axis between the fourth surface and a surface to be scanned of the optical scanning system.

In this connection, the third and fifth surfaces are aspherical surfaces which are rotationally symmetric. The surfaces can be expressed by the following equation.

$$X = \frac{C\phi^2}{1 + \sqrt{1 - (1+k)C^2\phi^2}} + \sum_i A_i \phi^{P_i} \quad \text{[Equation 1]}$$

$$\phi^2 = y^2 + z^2$$
$$C^* = C + A$$

($C^*$: paraxial radius of curvature)

First Embodiment

| Surface number | R(mm) | $r_0$(mm) | d(mm) | n(780nm) |
|---|---|---|---|---|
| 1 | ∞ | | 56.0 | |
| 2 | −909.205 | | 6.5 | 1.70400 |
| 3 | −118.186 | | 6.0 | |
| 4 | −115.000 | +41.080 | 9.0 | 1.48595 |
| 5 | −120.064 | | 193.0 | |

Aspherical coefficient
Third surface $k = -0.25484$
$A_1 = +0.89742 \times 10^{-6}$  $P_1 = 4$
$A_2 = -0.36272 \times 10^{-9}$  $P_2 = 6$
$A_3 = +0.29111 \times 10^{-12}$  $P_3 = 8$
$A_4 = -0.64822 \times 10^{-16}$  $P_4 = 10$ Fifth surface $k = -9.09304$
$A_1 = -0.15740 \times 10^{-5}$  $P_1 = 4$
$A_2 = +0.29031 \times 10^{-9}$  $P_2 = 6$
$A_3 = -0.10174 \times 10^{-12}$  $P_3 = 8$
$A_4 = -0.13436 \times 10^{-16}$  $P_4 = 10$

| | |
|---|---|
| Angle of incident light | $\alpha = 1.0472$ (rad) |
| Radius of inscribed circle of rotational polygonal mirror | $R_p = 17.3205$ (mm) |
| Number of surfaces of rotational polygonal mirror | $n = 6$ |
| Lateral magnification of secondary scanning direction | $M = 3.03$ |
| Configuration of nonsymmetrical surface | $k(+) = -0.49620 \times 10^{-2}$ |
| | $k(-) = -0.10420$ |
| | $k(+) - k(-) = 0.099238$ |
| | $0.005M^2 = 0.045905$ |

Second Embodiment

| Surface number | R(mm) | $r_0$(mm) | d(mm) | n(780nm) |
|---|---|---|---|---|
| 1 | ∞ | | 28.7 | |
| 2 | −65.066 | | 6.5 | 1.48595 |
| 3 | −38.696 | | 92.0 | |
| 4 | −290.000 | +30.070 | 3.0 | 1.48595 |
| 5 | −657.208 | | 103.5 | |

Aspherical coefficient
Third surface $k = -0.33158$
$A_1 = +0.39988 \times 10^{-10}$  $P_1 = 4$
$A_2 = -0.30836 \times 10^{-9}$  $P_2 = 6$
$A_3 = -0.90000 \times 10^{-14}$  $P_3 = 8$
$A_4 = +0.35036 \times 10^{-19}$  $P_4 = 10$ Fifth surface $k = -0.13115$
$A_1 = -0.23645 \times 10^{-6}$  $P_1 = 4$
$A_2 = +0.16326 \times 10^{-10}$  $P_2 = 6$
$A_3 = -0.15765 \times 10^{-14}$  $P_3 = 8$
$A_4 = +0.58274 \times 10^{-19}$  $P_4 = 10$

| | |
|---|---|
| Angle of incident light | $\alpha = 1.0472$ (rad) |
| Radius of inscribed circle of rotational polygonal mirror | $R_p = 17.3205$ (mm) |
| Number of surfaces of rotational polygonal mirror | $n = 6$ |
| Lateral magnification of secondary scanning direction | $M = 0.99$ |
| Configuration of nonsymmetrical surface | $k(+) = +0.0066159$ |
| | $k(-) = -0.016540$ |
| | $k(+) - k(-) = 0.023156$ |
| | $0.005M^2 = 0.004900$ |

Third Embodiment (Lens data is the same as that of the first embodiment.)

| | |
|---|---|
| Angle of incident light | $\alpha = 1.0472$ (rad) |
| Radius of inscribed circle of rotational polygonal mirror | $R_p = 40.3927$ (mm) |

-continued

| | |
|---|---|
| Number of surfaces of rotational polygonal mirror | n = 8 |
| Lateral magnification of secondary scanning direction | m = 0.99 |
| Configuration of non-symmetrical surface | k(+) = +0.0018913 |
| | k(−) = −0.022695 |
| | k(+) − k(−) = 0.024586 |
| | $0.005M^2$ = 0.004900 |

Fourth Embodiment (lens data is the same as that of the first embodiment.)

| | |
|---|---|
| Angle of incident light | α = 1.5708 (rad) |
| Radius of inscribed circle of rotational polygonal mirror | Rp = 20.0000 (mm) |
| Number of surfaces of rotational polygonal mirror | n = 6 |
| Lateral magnification of secondary scanning direction | M = 0.99 |
| Configuration of non-symmetrical surface | k(+) = +0.0095493 |
| | k(−) = −0.012414 |
| | k(+) − k(−) = 0.021963 |
| | $0.005M^2$ = 0.004900 |

Fifth Embodiment (Lens data is the same as that of the first embodiment.)

| | |
|---|---|
| Angle of incident light | α = 1.5708 (rad) |
| Radius of inscribed circle of rotational polygonal mirror | Rp = 17.3205 (mm) |
| Number of surfaces of rotational polygonal mirror | n = 6 |
| Lateral magnification of secondary scanning direction | M = 0.99 |
| Configuration of non-symmetrical surface | k(+) = +0.011027 |
| | k(−) = −0.011027 |
| | k(+) − k(−) = 0.022054 |
| | $0.005M^2$ = 0.004900 |

Sixth Embodiment

| Surface number | R(mm) | $r_0$(mm) | d(mm) | n(780nm) |
|---|---|---|---|---|
| 1 | ∞ | | 28.7 | |
| 2 | −44.230 | | 6.5 | 1.48595 |
| 3 | −30.430 | | 60.0 | |
| 4 | −175.000 | +32.627 | 3.0 | 1.48595 |
| 5 | −281.067 | | 142.2 | |

Aspherical coefficient
Third surface k = −0.44007
$A_1 = -0.15879 \times 10^{-6}$  $P_1 = 4$
$A_2 = -0.45351 \times 10^{-9}$  $P_2 = 6$
$A_3 = -0.10179 \times 10^{-13}$  $P_3 = 8$
$A_4 = +0.29467 \times 10^{-19}$  $P_4 = 10$ Fifth surface k = −5.0046
$A_1 = -0.55585 \times 10^{-6}$  $P_1 = 4$
$A_2 = -0.59331 \times 10^{-10}$  $P_2 = 6$
$A_3 = -0.11715 \times 10^{-13}$  $P_3 = 8$
$A_4 = +0.77691 \times 10^{-18}$  $P_4 = 10$

| | |
|---|---|
| Angle of incident light | α = 1.5708 (rad) |
| Radius of inscribed circle of rotational polygonal mirror | Rp = 17.3205 (mm) |
| Number of surfaces of rotational polygonal mirror | n = 6 |
| Lateral magnification of secondary scanning direction | M = 1.79 |
| Configuration of nonsymmetrical surface | k(+) = +0.016099 |
| | k(−) = −0.023156 |
| | k(+) − k(−) = 0.039255 |

-continued $0.005M^2$ = 0.016021

In the above embodiment, the lens located on the side of a scanned surface includes a non-symmetrical surface with respect to the optical axis, and the non-symmetrical surface is located on the side of a rotational polygonal mirror. However, it should be noted that the present invention is not limited to the specific embodiment, and a lens surface on the rotational polygonal mirror side may includes a non-symmetrical surface with respect to the optical axis, and alternatively a surface located on the scanned surface may be formed to be non-symmetrical with respect to the optical axis.

In this connection, a cylindrical, toric, symmetrical or deformed cylindrical surface may be included in this optical scanning system, and a plurality of non-symmetrical surfaces with respect to the optical axis may be included. Further, a plurality of non-symmetrical surfaces with respect to the optical axis may be utilized.

Figure 2:
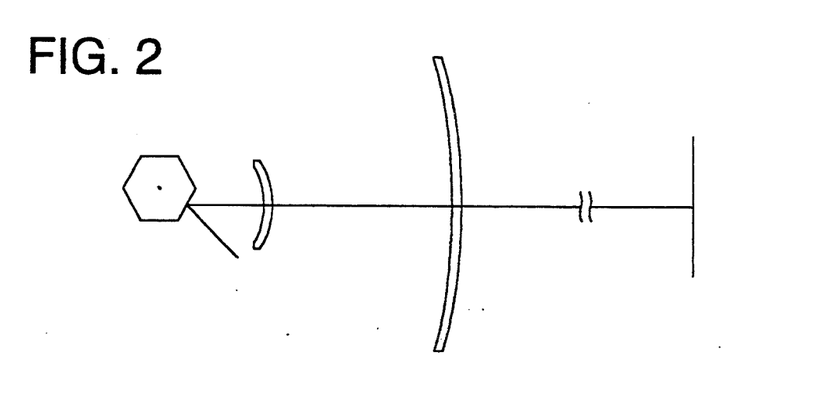
FIG. 2 is a sectional view of the primary scanning direction including the optical axis, wherein the sectional view shows the second embodiment of the optical scanning system of the present invention.
Figure 3:
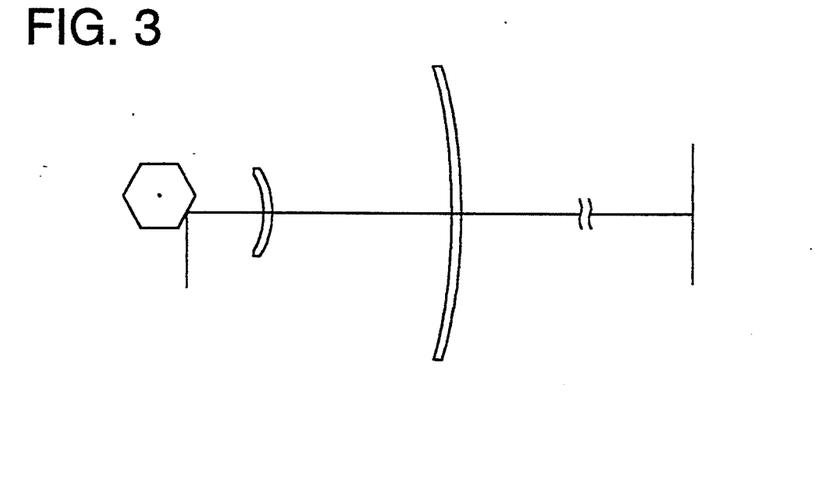
FIG. 3 is a sectional view of the primary scanning direction including the optical axis, wherein the sectional view shows the sixth embodiment of the optical scanning system of the present invention.

In the optical scanning system of the present invention, the non-symmetrical lens illustrated in FIG. 5 is utilized. As a result, as described in each embodiment shown in FIGS. 1 to 3, when only two image formation lenses are used as illustrated in FIGS. 6 to 11, non-symmetry of the image surface curvature on the secondary scanning direction surface caused when a rotational polygonal mirror is used as a reflection means can be appropriately corrected. Accordingly, a highly efficient light beam scanning device can be realized, and the manufacturing cost can be reduced when the lens is made of plastics.

What is claimed is:

1. A light beam scanning device comprising:
   (a) a rotational polygonal mirror having a reflecting surface for reflecting a light beam sent from a laser beam source and for scanning a surface to be scanned with the light beam; and
   (b) an optical scanning system disposed between said mirror and said scanned surface, for forming an image on said scanned surface by the reflected light beam, and for setting the reflecting surface of said mirror and said scanned surface in a geometrical-optical conjugate relation on a secondary scanning direction surface, said optical scanning system including a surface on which a change in a radius of curvature in a secondary scanning direction is non-symmetrical with respect to a distance from an optical axis of said system, wherein the following formulae are satisfied:

$$rh(\pm) = r_0 + (1 + k(\pm) \cdot Rp \cdot \alpha/n) \cdot R \cdot [1 - \cos\{\sin^{-1}(h/R)\}]$$

and $$k(+) - k(-) > 0.005M^2$$

where: α represents an angle formed between an incident light beam upon said mirror and the optical axis; Rp represents the radius of an inscribed circle of said mirror; n represents the number of surfaces of said mirror; R represents the radius of curvature of a non-symmetrical surface with respect to the optical axis in a primary scanning direction section including the optical axis; $r_0$ represents the radius of curvature in the secondary scanning direction section; rh(+) represents the radius of curvature in the secondary scanning direction section parallel to the optical axis at a position distant from the optical axis by h in the direction of "+" in the primary scanning direction, and rh(−) represents the radius of curvature in the secondary scanning direction section parallel to the optical axis at a position distant from the optical axis by h in the direction of "−" in the primary scanning direction, when a primary scanning side including a rotational center of said mirror is defined as the "+" side with respect to the optical axis of the optical scanning system, and the opposite side is defined as the "−" side; k(+) represents a coefficient on the "+" image height side; k(−) represents a coefficient on the "−" image height side; and M represents a lateral magnification in the secondary scanning direction of said scanning system.

2. The light beam scanning device of claim 1, wherein the lateral magnification in the secondary scanning direction of said scanning system is not more than 3.

3. The light beam scanning device of claim 1, wherein said scanning system comprises two lenses, and a lens including a non-symmetrical surface with respect to the optical axis is a plastic lens.

* * * * *